US008088858B2

(12) United States Patent
Pharr

(10) Patent No.: US 8,088,858 B2
(45) Date of Patent: Jan. 3, 2012

(54) CONCRETE CRACK AND JOINT SEALANT AND METHOD

(75) Inventor: Bartholomew Scott Pharr, Mount Airy, NC (US)

(73) Assignee: Marketing Associates, Inc., Mount Airy, NC (US)

( * ) Notice: Subject to any disclaimer, the term of this patent is extended or adjusted under 35 U.S.C. 154(b) by 130 days.

(21) Appl. No.: 12/689,063

(22) Filed: Jan. 18, 2010

(65) Prior Publication Data

US 2010/0184903 A1    Jul. 22, 2010

Related U.S. Application Data

(60) Provisional application No. 61/145,312, filed on Jan. 16, 2009.

(51) Int. Cl.
*C08K 3/26* (2006.01)

(52) U.S. Cl. .......................... 524/426; 524/442; 524/451

(58) Field of Classification Search .................. 524/426
See application file for complete search history.

(56) References Cited

U.S. PATENT DOCUMENTS

| 6,204,321 | B1 * | 3/2001 | Lanoye ......................... 524/571 |
| 6,653,408 | B1 * | 11/2003 | St. Clair ..................... 525/327.8 |
| 2003/0166760 | A1 * | 9/2003 | Taylor et al. ................. 524/442 |
| 2004/0059036 | A1 * | 3/2004 | Gaveske ....................... 524/445 |

OTHER PUBLICATIONS

MTAG vol. II—Rigid Pavement Preservation 2nd Edition, Chapter 4, Dec. 11, 2007.*

* cited by examiner

*Primary Examiner* — Doris Lee
(74) *Attorney, Agent, or Firm* — Spilman Thomas & Battle, PLLC

(57) ABSTRACT

Crack and joint sealant and method, an embodiment of the crack and joint sealant having a composition that is both gray and meets certain ASTM standards.

17 Claims, 1 Drawing Sheet

CONCRETE CRACK AND JOINT SEALANT AND METHOD

CROSS-REFERENCE TO RELATED APPLICATIONS

The present application claims priority to U.S. provisional patent application Ser. No. 61/145,312 filed Jan. 16, 2009, which is incorporated herein in its entirety.

FIELD OF THE INVENTION

This invention is related to sealants, and more particularly to crack and joint sealants for concrete and roads.

BACKGROUND OF THE INVENTION

A crack or joint in a concrete roadway may be filled with a crack and joint sealant, such as an ASTM-D6690 Type II crack and joint sealant. Currently, there are hundreds of millions of pounds of black ASTM-D6690 Type II crack and joint sealant in the road.

However, concrete roadways are generally gray in color. Thus, a concrete roadway that is sealed with a black or very dark ASTM-D6690 Type II crack and joint sealant may be aesthetically unpleasant. Furthermore, the contrast in colors of the crack and joint sealant and concrete may distract drivers on freeways and other roads, introducing safety concerns. Since millions of miles of concrete road have cracks and expansion or other joints that need to be and will be sealed every year, there is an opportunity to provide a solution that may overcome those drawbacks.

Applying crack and joint sealant that is the same color as the concrete to which it is being applied may address those issues. Various civic officials and transportation engineers have therefore requested use of a crack and joint sealant that has a color closer to that of the concrete to which it is being applied.

Though gray crack and joint sealants may have been produced and marketed, no such sealant is believed to have met the ASTM-DD690 Type II specification. Therefore, those sealants cannot be applied to roads such as those that include Portland cement concrete and asphaltic concrete pavements.

Accordingly, there may be a need for a gray crack and joint sealant that complies with the ASTM-D6690 Type II specification and is lighter and closer to the color of the roads and pavements in which it is to be applied than existing black or very dark crack and joint sealants.

BRIEF DESCRIPTION OF THE DRAWINGS

The accompanying drawing, wherein like reference numerals are employed to designate like components, is included to provide a further understanding of gray crack and joint sealants, is incorporated in and constitutes a part of this specification, and illustrates embodiments of a gray crack and joint sealant that together with the description serve to explain the principles of gray crack and joint sealants.

Various other objects, features and advantages of the invention will be readily apparent according to the following description exemplified by the drawing, which are shown by way of example only, wherein.

DETAILED DESCRIPTION

Figure 1:
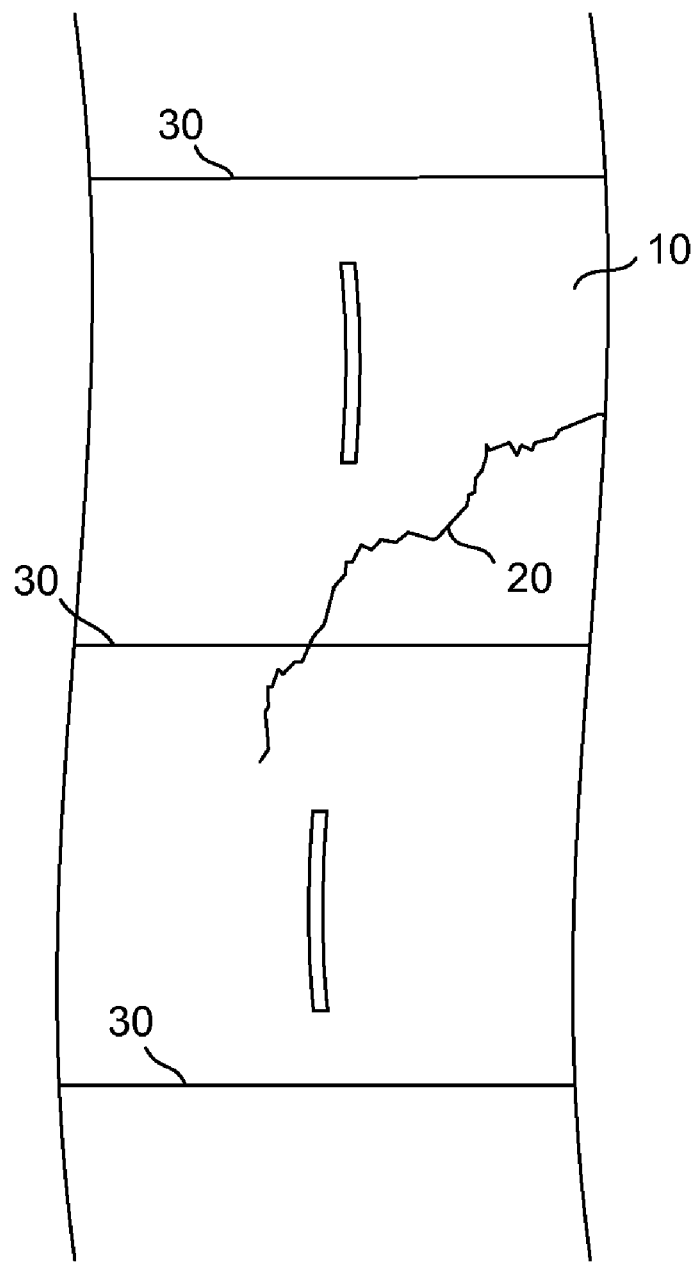
FIG. 1 illustrates an embodiment of a road with a crack and joint filled with a crack and joint sealant.

Reference will now be made to embodiments of gray crack and joint sealants, examples of which are illustrated in the accompanying drawings. Details, features, and advantages of the gray crack and joint sealants will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

FIG. 1 illustrates a roadway 10 having a crack 20 and joints 30, in accordance with one embodiment. The roadway in the embodiment illustrated in FIG. 1 is made, at least in part, of concrete, though it may be reinforced with steel and may include other materials as desired or to meet various requirements for the roadway 10. In an embodiment, the roadway includes, at least in part, Portland cement concrete or asphaltic concrete pavement. That roadway may be light gray or gray in color.

The crack 20 and joints 30, such as expansion joints, in the roadway 10 may be filled with a crack and joint sealant, such as an ASTM-D6690 Type II-compliant crack and joint sealant. A gray ASTM-D6690 Type II-compliant crack and joint sealant, embodiments of which are described herein, may be used to fill the crack 20 and joints 30, as well as filling other matter in other embodiments. That gray crack and joint sealant may more closely approximate the color of typical roadways, such as those including Portland cement concrete or asphaltic concrete pavement, than existing ASTM-D6690 Type II-compliant crack and joint sealants. That gray crack and joint sealant may also comply with the ASTM-DD6690 Type 1 specification.

In an embodiment, the gray crack and joint sealant includes a rosin ester (also referred to as pentaerythritol rosin ester or pentaerythritol ester of rosin) or a hydrocarbon ester (also referred to as hydrocarbon resin). The rosin ester or hydrocarbon ester may be used, such as instead of the asphalt that is used in some current black or darker sealants, to produce a gray binder. Both rosin ester and hydrocarbon ester may work sufficiently alone as a binder, and may also be used together in an embodiment as desired. In embodiments, such as any of those in Tables 1-3, Sylvalite® RE85L (rosin ester, i.e., pentaerythritol ester of rosin) or Sylvatac® RE85 (hydrocarbon resin), manufactured by Arizona Chemical, headquartered in Jacksonville, Fla., may be specifically used.

Resins and rosin esters may not have the same inherent properties of flexibility and stiffness as asphalt, though. Therefore, in an embodiment, the resin and/or rosin ester may be modified heavily with a styrene block copolymer, such as styrene butadiene styrene (SBS), and another polymer or polymers such as those mentioned below. The resin and/or rosin ester may be modified by a conventional heating method to provide flexibility. That modification may be expensive, however, and thus, in an embodiment, the mineral filler content of the gray crack and joint sealant may be extremely high as compared to standard asphalt-based binders. High mineral content can lead to a loss of flexibility, though, so the mineral fillers of the binder may be at least 20% of a mineral that has a low oil absorption value. Examples of such a mineral filler are barium sulfate and silica flour. To provide a more liquid texture, there may be a high level of oil in the compound, such as naphthenic oil or another oil. In an embodiment, titanium dioxide (TiO2) may be included in the crack and joint sealant to at least contribute to the crack and joint sealant's grayness.

A gray crack and joint sealant including the aforementioned substances, specific embodiments of which are provided below in Tables 1-3, may be aesthetically pleasing, yet still meet the requirements of the ASTM-D6690 Type II specification. If the gray crack and joint sealant has a high mineral content, that sealant may also be cost effective or cost competitive compared to black crack and joint sealants. The gray crack and joint sealant may, as mentioned above, be less distracting and thus safer to a driver because it may more closely approximate the color of the roadway in which it is applied, such as a roadway including Portland cement concrete or asphaltic concrete pavement or other roadway that is light gray or gray. Therefore, by using embodiments of the gray crack and joint sealant, the public may be better served by its state and local governments for not only aesthetic reasons, but safety reasons as well. Thus, embodiments of the gray crack and joint sealant may have the potential for tremendous sales, as the market for ASTM-D6690 Type II-compliant gray crack and joint sealants is believed to be large and untapped.

One embodiment of the gray crack and joint sealant was confidentially produced by Fibrecrete Technologies, LLC through the codename, "Frost." Frost was designed to meet the ASTM-D6690 Type II specification with respect to extension of 50% three different times at −20 F (−29 C).

In embodiments, the gray crack and joint sealant may have various materials, each having a range of concentrations. As used herein, the "concentration" of a substance of the gray crack sealant, such as provided in the embodiments of Tables 1 through 3, refers to the percentage of the mass of the gray crack sealant. Thus, for example, the oil listed in Table 1 below has a concentration of 10 to 20 percent, and thus 10 to 20 percent of the mass of the gray crack sealant in Table 1 is oil. In one embodiment that may be ASTM-D6690 Type II-compliant, the gray crack and joint sealant has the composition provided below in Table 1:

TABLE 1

| Substance | Concentration |
| --- | --- |
| oil | 10-20% |
| styrene butadiene styrene (SBS) | 2-5% |
| hydrocarbon resin or rosin ester | 8-15% |
| styrene isoprene styrene (SIS) | 1-5% |
| ethyl vinyl acetate (EVA) | 0-3% |
| titanium dioxide (TiO2) | 0.2-0.6% |
| calcium carbonate or talc | 20-50% |
| fumed silica, silica flour, or a combination of fumed silica and silica flour | 10-50% |

In the gray crack and joint sealant of Table 1 above, the final substance is fumed silica, silica flour, or a combination of fumed silica and silica flour at 10 to 50 percent of the total concentration of the gray crack and joint sealant, meaning that there are three options for that final substance. The first option is fumed silica at 10 to 50 percent of the total concentration, the second option is silica flour at 10 to 50 percent of the total concentration, and the third option is any combination of fumed silica and silica flour that together adds up to 10 to 50 percent of the total concentration. For example, that third option may include an equal amount of fumed silica and silica flour, or three times as much silica flour as fumed silica or vice versa, or any other combination of fumed silica and silica flour, as long as that combination together is 10 to 50 percent of the total concentration of the gray crack and joint sealant.

In another embodiment, the gray crack and joint sealant has the concentrations listed in Table 1 except that the last listed chemical substance (fumed silica, silica flour, or a combination of fumed silica and silica flour at 10 to 50 percent of the total concentration) is replaced with barium sulfate or silica flour at 20 to 50 percent of the total concentration.

In embodiments, the oil in Table 1 may be naphthenic oil or tall oil. In embodiments, the SBS, SIS, and EVA may be polymer modifiers. The barium sulfate ("Barytes"—BaSO4) and the Silica Flour (SiO2O) may be proprietary fillers.

The gray crack and joint sealant of Table 1 (as well as Tables 2 and 3 below if desired) may be produced by mixing the listed chemical substances either dry or in heated liquid form. The gray crack and joint sealant may be produced through indirect heating methods, such as oil jacketing or another method. In an embodiment, the gray crack and joint sealant may be heated using indirect heating methods, such as by the method using a double boiler or a hot oil circulating kettle capable of constant material agitation. The product may then be applied to a roadway in a conventional or other manner.

In another embodiment, the gray crack and joint sealant may have a narrower concentration range than the range listed in Table 1. Thus, in another embodiment that may be ASTM-D6690 Type II-compliant, the gray crack and joint sealant has the composition provided below in Table 2:

TABLE 2

| Substance | Concentration |
| --- | --- |
| naphthenic oil or tall oil | 13-17% |
| styrene butadiene styrene (SBS) | 2-4% |
| hydrocarbon resin | 10-13% |
| styrene isoprene styrene (SIS) | 1-3% |
| ethyl vinyl acetate (EVA) | 1-2% |
| titanium dioxide (TiO2) | 0.4-0.6% |
| calcium carbonate | 25-40% |
| silica flour | 10-35% |
| fumed silica | 10-35% |

In various embodiments, any substance (and its concentration) of the crack and joint sealant of Table 2 may replace the corresponding substance (and its concentration) in Table 1. Thus, the oil at 10 to 20 percent listed in Table 1 may be replaced by the naphthenic oil or tall oil at 13 to 17 percent listed in Table 2. Alternatively or in addition, the SBS at 2 to 5 percent listed in Table 1 may be replaced by the SBS at 2 to 4 percent listed in Table 2. Alternatively or in addition, the hydrocarbon resin or rosin ester at 8 to 15 percent listed in Table 1 may be replaced by the hydrocarbon resin or rosin ester at 10 to 13 percent listed in Table 2. Alternatively or in addition, the SIS at 1 to 5 percent listed in Table 1 may be replaced by the SIS at 1 to 3 percent listed in Table 2. Alternatively or in addition, the EVA at 0 to 3 percent listed in Table 1 may be replaced by the EVA at 1 to 2 percent listed in Table 2. Alternatively or in addition, the TiO2 at 0.2 to 0.6 percent listed in Table 1 may be replaced by the TiO2 at 0.4 to 0.6 percent listed in Table 2. Alternatively or in addition, the calcium carbonate or talc at 20 to 50 percent listed in Table 1 may be replaced by the calcium carbonate or talc at 25 to 40 percent listed in Table 2. Alternatively or in addition, the fumed silica, silica flour, or a combination of fumed silica and silica flour at 10 to 50 percent listed in Table 1 may be replaced by the combination of the silica flour at 10 to 35 percent and the fumed silica at 10 to 35 percent listed in Table 2.

In another embodiment that may be ASTM-D6690 Type II-compliant, the gray crack and joint sealant has the composition provided below in Table 3:

TABLE 3

| Substance | CAS Number | Concentration |
| --- | --- | --- |
| rosin ester | 8050-26-8 | 0%-20% |
| styrene butadiene styrene (SBS) | 9003-55-8 | 0%-10% |
| naphthenic oil | 64742-59-2 | 0%-20% |
| ethyl vinyl acetate (EVA) | 24937-78-8 | 0%-5% |
| calcium carbonate | 1317-65-3 | 0%-50% |
| polymer modifier (styrene isoprene styrene (SIS)) | | <20% |
| proprietary filler (fumed silica, silica flour, or a combination of fumed silica and silica flour) | | 0-50% |

In Table 3, some of the named substances are specified for clarity by their Chemical Abstract Service Registry Number ("CAS Number"). For example, rosin ester may be considered by a synonymous name, such as pentaerythritol rosinate or pentaerythritol ester of rosin, but is still considered to be the chemical substance specified by its CAS Number 8050-26-8.

In various embodiments, the concentrations provided in Tables 1-3 above do not reflect absolute minimums and maximums. Instead, those ranges of concentrations reflect values that are typical and may vary. In embodiments, those concentration ranges are substantially as listed.

Gray crack and joint sealant embodiments herein, as noted herein, may be ASTM-D6690 Type II-compliant. Thus, for example, those crack and joint sealants may meet ASTM-D6690 Type II test requirements such as those listed below in Table 4:

TABLE 4

| Test | Requirements |
| --- | --- |
| Cone Penetration | 90 Maximum |
| Flow | 3 mm Maximum |
| Softening Point | 176° F. Minimum |
| Resilience | 60% Minimum |
| Bond, −20° F., 50% Extension | Pass 3 Cycles |
| Minimum Application Temp. | 380° F. |
| Maximum Heating Temp. | 400° F. |

Various embodiments of the gray crack and joint sealant disclosed herein may be hot applied single component sealants. Those gray crack and joint sealants may have several properties that facilitate their use, such as the ability to cohesively bond to concrete, flexibility, self-leveling for easy and efficient application, resistance to ultraviolet light, insolubility in water, and stability under normal conditions. In one or more stages of production or application, embodiments of the gray crack and joint sealant provided herein may have a resin odor and may be in the form of a powder, and/or may have other properties.

After manufacturing, various embodiments of the gray crack and joint sealant may be supplied as desired, such as in solid form and packaged in a 50 pound cardboard box with a meltable plastic liner, or in 30 pound melt bags. The weight may be 14.8 pounds per gallon or another weight. The shelf life may be two years or another shelf life.

While specific embodiments of the invention have been described in detail, it should be appreciated by those skilled in the art that various modifications and alternations and applications could be developed in light of the overall teachings of the disclosure. For example, though the crack and joint sealant embodiments herein have been described as applicable to roadways, those crack and joint sealants may be applied to sidewalks, parking lots and structures, bridge decks, concrete pavements, and other matter that includes Portland cement concrete or asphaltic concrete pavement and possibly other such concretes and pavements. Accordingly, the particular arrangements products, and methods disclosed are meant to be illustrative only and not limiting as to the scope of the invention.

What is claimed is:

1. A crack and joint sealant, comprising, by percentage of the mass of the crack and joint sealant:
   about 10 to 20 percent oil;
   about 2 to 5 percent styrene butadiene styrene (SBS)
   about 8 to 15 percent of a substance selected from the group consisting of hydrocarbon resin and rosin ester;
   about 1 to 5 percent styrene isoprene styrene (SIS);
   about 0 to 3 percent ethyl vinyl acetate (EVA);
   about 0.2 to 0.6 percent titanium dioxide (TiO2);
   about 20 to 50 percent of a substance selected from the group consisting of calcium carbonate and talc; and
   about 10 to 50 percent of a substance selected from the group consisting of fumed silica, silica flour, and a combination of fumed silica and silica flour wherein the crack and joint sealant is ASTM-D6690 Type II-compliant.

2. The crack and joint sealant of claim 1, wherein the oil is naphthenic oil.

3. The crack and joint sealant of claim 1, wherein the oil is tall oil.

4. The crack and joint sealant of claim 1, wherein the oil is selected from the group consisting of naphthenic oil and tall oil and is present in the amount from about 13 to 17 percent.

5. The crack and joint sealant of claim 1, wherein the SBS is present in the amount from about 2 to 4 percent.

6. The crack and joint sealant of claim 1, wherein the hydrocarbon resin is present in an amount from about 10 to 13 percent.

7. The crack and joint sealant of claim 1, wherein the SIS is present in an amount from about 1 to 3 percent.

8. The crack and joint sealant of claim 1, wherein the EVA is present in an amount from about 1 to 2 percent.

9. The crack and joint sealant of claim 1, wherein the TiO2 is present in an amount from about 0.4 to 0.6 percent.

10. The crack and joint sealant of claim 1, wherein the calcium carbonate is present in an amount from about 25 to 40 percent.

11. The crack and joint sealant of claim 1, wherein the substance selected from the group consisting of fumed silica, silica flour, and a combination of fumed silica and silica flour is fumed silica.

12. The crack and joint sealant of claim 1, wherein the substance selected from the group consisting of fumed silica, silica flour, and a combination of fumed silica and silica flour is silica flour.

13. The crack and joint sealant of claim 1, wherein the substance selected from the group consisting of fumed silica, silica flour, and a combination of fumed silica and silica flour is the combination of fumed silica and silica flour, and wherein the fumed silica is about 10 to 35 percent and the silica flour is about 10 to 35 percent.

14. The crack and joint sealant of claim 1, wherein the substance selected from the group consisting of hydrocarbon resin and rosin ester is rosin ester.

15. The crack and joint sealant of claim 1, wherein the substance selected from the group consisting of hydrocarbon resin and rosin ester is hydrocarbon resin.

16. A crack and joint sealant, comprising, by percentage of the mass of the crack and joint sealant:
- about greater than 0 to 20 percent naphthenic oil;
- about greater than 0 to 10 percent styrene butadiene styrene (SBS);
- about greater than 0 to 20 percent rosin ester;
- about greater than 0 to 5 percent ethyl vinyl acetate (EVA);
- about greater than 0 to 50 percent calcium carbonate;
- less than about 20 percent styrene isoprene styrene (SIS); and
- about greater than 0 to 50 percent of a substance selected from the group consisting of fumed silica, silica flour, and a combination of fumed silica and silica flour wherein the crack and joint sealant is ASTM-D6690 Type II-compliant.

17. A crack and joint sealant, comprising, by percentage of the mass of the crack and joint sealant:
- about 13 to 17 percent of a substance selected from the group consisting of naphthenic oil and tall oil;
- about 2 to 4 percent styrene butadiene styrene (SBS)
- about 10 to 13 percent hydrocarbon resin;
- about 1 to 3 percent styrene isoprene styrene (SIS);
- about 1 to 2 percent ethyl vinyl acetate (EVA);
- about 0.4 to 0.6 percent titanium dioxide (TiO2);
- about 25 to 40 percent calcium carbonate;
- about 10 to 35 percent silica flour; and
- about 10 to 35 percent fumed silica wherein the crack and joint sealant is ASTM-D6690 Type II-compliant.

* * * * *